April 16, 1963  T. A. THOMPSON  3,085,452
INDEXING TABLE

Filed July 8, 1959  5 Sheets-Sheet 1

INVENTOR.
THOMAS A. THOMPSON
BY
ATTORNEY

April 16, 1963  T. A. THOMPSON  3,085,452
INDEXING TABLE
Filed July 8, 1959  5 Sheets-Sheet 2

INVENTOR.
THOMAS A. THOMPSON
BY
ATTORNEY

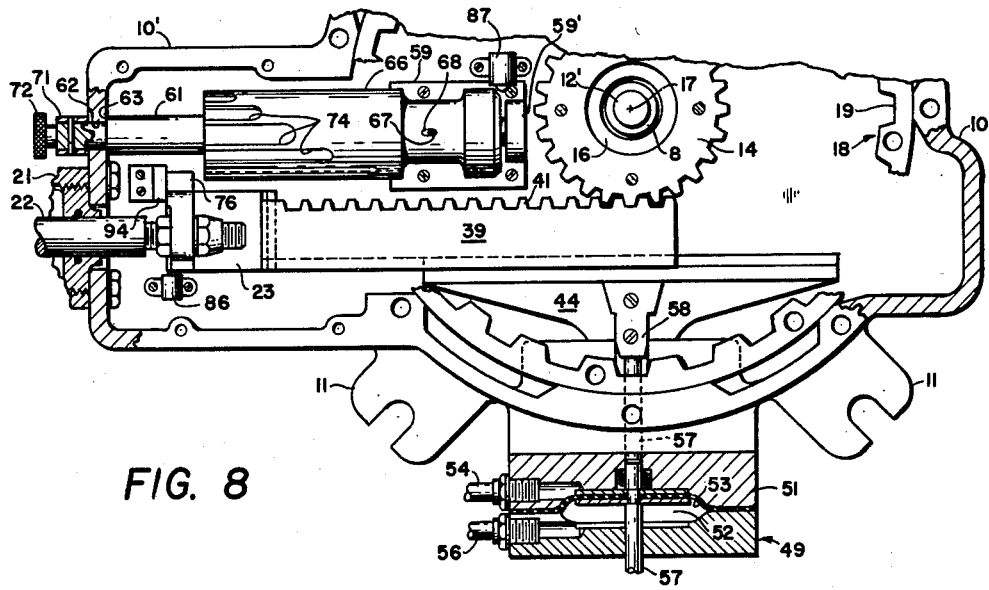
FIG. 8
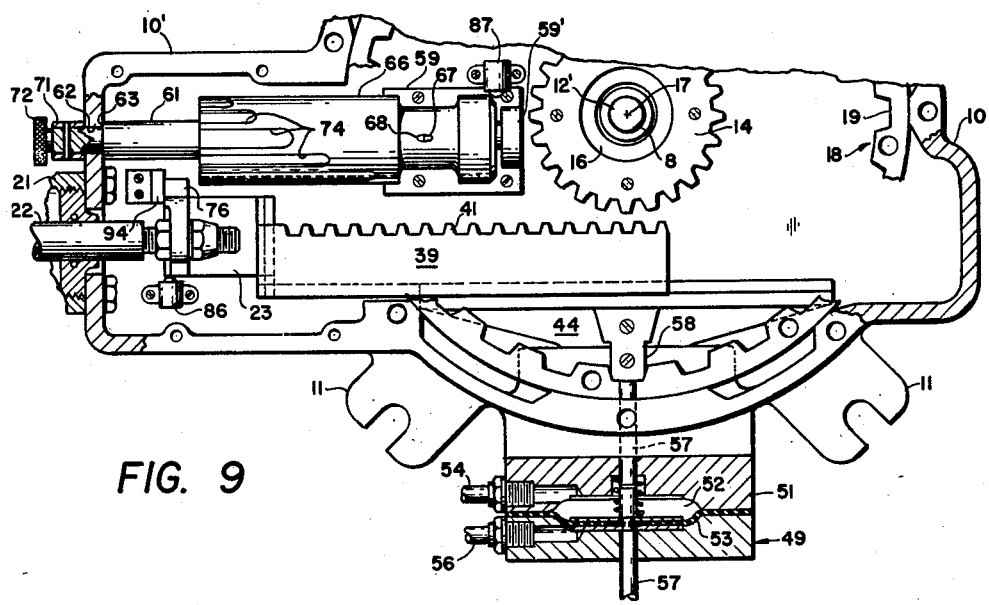
FIG. 9
*INVENTOR.*
THOMAS A. THOMPSON
BY 
ATTORNEY

Fig. 11.

United States Patent Office 3,085,452
Patented Apr. 16, 1963

3,085,452
INDEXING TABLE
Thomas A. Thompson, Columbus, Ohio, assignor, by mesne assignments, to Societe d'Exploitation des Materiels Hispano Suiza, Bois-Colombes, Seine, France
Filed July 8, 1959, Ser. No. 825,813
2 Claims. (Cl. 74—822)

This invention relates generally to a new and improved indexing table.

Indexing work tables are often used when it is desired to perform several machining operations on a given work piece wherein the operations take place at spaced work stations. The table is arranged so that a work piece is progressively moved by the table to each of the work stations until all of the operations are completed. Such an arrangement improves the performance of the machining operations since it permits a single operator to load unmachined work pieces, remove the completed work pieces, and operate a plurality of machines performing simultaneous machining operations. Because the accuracy of the machining operation is determined to a great extent on the accurate positioning of the work pieces, it is essential that the indexing table provide positive and accurate positioning.

It is an important object of this invention to provide a work holding indexing table which is movable through predetermined arcuate increments employing means to obtain accurate positioning of the work at each station.

It is another important object of this invention to provide an indexing work table including means to adjust the arcuate movement through which the table moves during each indexing operation.

It is another object of this invention to provide an indexing table which includes means to positively control the position of the table during all phases of its operation.

Further objects and advantages will appear from the following description and drawings, wherein:

FIGURE 8 is a view similar to FIGURES 6 and 7 showing the position the elements assume after the table is rotated at the end of the second phase of the indexing operation;

FIGURE 9 is a view similar to FIGURES 6 to 8 showing the position of the elements at the end of the third phase of the operation;

FIG. 11 is a schematic view on an enlarged scale of one of the valves used in the indexing table.

Figure 5:
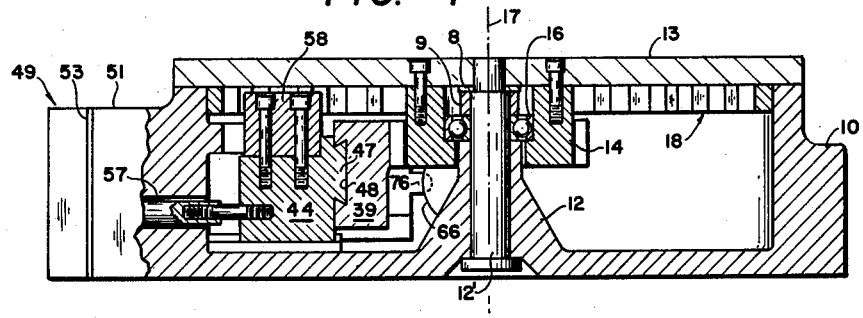
FIGURE 5 is a fragmentary section taken along 5—5 of FIGURE 1 illustrating the structure of the rack mounting.

Referring to the drawings, the indexing table includes a base 10 formed with mounting lugs 11 which are used to mount the indexing table in any required position on the machine tool intended to perform the work. The base 10 is generally cup-shaped and formed with a central hub 12 (FIGURE 5) extending upwardly from the bottom wall thereof. A shaft 12' is press fitted in the hub 12 and extends beyond its free end to a pinion gear 14 journalled thereon through an adequate bearing 16. This bearing is axially locked in the shaft 12' in one direction by the free end of the hub 12 and in the other direction by a collar 9 retained on the shaft 12' by a split ring 8. Fixed on the upper end of the pinion gear 14 by bolts or the like is a rotatable table 13 which extends laterally over the upper end of the base 10 for rotation relative to the base on a central axis 17. Underneath the table 13 is affixed an indexing ring 18 formed with equally spaced recesses or sockets 19 which co-operate with the locking mechanism hereinafter described to accurately secure the table in the desired position.

The base 10 is formed with a lateral extension 10' on which is affixed a pneumatic cylinder 21 extending laterally from the base 10 and within which is slidably mounted a piston head 24 having a piston rod 22 extending therefrom in one direction and a projection 36 extending in the other direction. The piston head 24 operates in the usual way to cause axial movement of the piston rod 22 in response to air pressure supplied through one of the pressure lines 26 or 27. When air under pressure is supplied through the pressure line 26 and the pressure line 27 is vented, the piston head 24 and piston rod 22 move to the right. Conversely, when the opposite air connections are provided, the piston head 24 and piston rod 22 move to the left. One end of the cylinder 21 is closed by a cylinder head 31 within which are operatively mounted a check valve 28 and two needle valves 32 and 38. This head is also formed with a central bore 29 adapted to accommodate the extension 36 for slidable movement therein. When air under pressure is supplied through the line 26, it opens the one way check valve 28 and flows freely into the left end of the cylinder 21. However, on the back stroke, which occurs when the pressure is admitted through the pressure line 27, the check valve 28 closes. This makes it necessary for the exhaust air to flow through a central bore 29 and out past the adjustable needle valve 32. The needle valve 32 is supported by a threaded head 33 which is formed with notches 34 to permit unrestricted flow past the head. The needle valve 32 is adjusted so that the speed of the backward stroke is not excessive and sufficient back pressure is provided to retard the backward stroke when the projection 36 on the piston rod 22 enters the central bore 29. As the piston rod 22 approaches the end of its stroke, the projection 36 operates as a valve to prevent direct communication with the needle valve 32. When the projection 36 enters the bore 29, the exhaust air must pass through a passage 37 provided within the cylinder head 31 and past the small needle valve 38. The needle valve 38 is connected to the needle valve 32 through the bore 29 via a port 38' and is adjusted to provide a cushioning action which slows the movement of the piston rod 22 as it reaches the end of its travel in a left-hand direction. Therefore, the needle valve 32 provides speed control and the needle valve 38 controls the cushioning at the end of the stroke.

Figure 4:
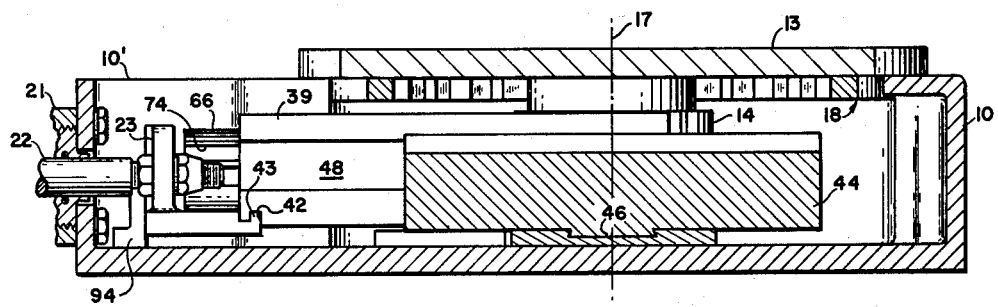
FIGURE 4 is a fragmentary section taken along 4—4 of FIGURE 1 illustrating the structure of the mounting of the rack carrier.

Affixed to the free end of the piston rod 22 is a cross head 23 to which is connected one end of a rack 39. This rack is formed with a lateral groove 42 shown in FIGURE 4 which receives a projection 43 on the cross head 23 so that the rack 39 moves axially with the cross head 23 but is free to move laterally relative thereto. The rack 39 is formed with teeth 41 which are adapted to mesh with the pinion gear 14 during a portion of the cycle of the indexing table and cause the pinion 14 and in turn the table 13 to rotate. A rack carrier 44 is mounted by a dovetail 46 on the bottom of the base 10 for movement in a direction perpendicular to the rack 39 (FIGURE 4). A second dovetail 47 on the rack carrier 44 engages a dovetail groove 48 in the side of the rack 39 (FIGURE 5) so that the rack 39 is supported on the rack carrier 44 and is axially movable relative thereto. This structure permits axial movement of the rack 39 by the cross head 23 and lateral movement of the rack 39 with the rack carrier 44.

In order to move the rack carrier 44 perpendicular to the rack 39 to mesh or disengage the rack from the pinion 14, a diaphragm type actuator 49 is provided. The diaphragm actuator 49 includes a two-piece housing 51 formed with a central cavity 52. A diaphragm 53 is clamped on the housing 51 and divides the central cavity 52 in the two chambers. A first pressure line 54 is connected to the cavity 52 on the inner side of the diaphragm 53 and a second pressure line 56 is connected to the cavity on the outer side of the diaphragm 53. Thus, when air under pressure is admitted to the outer side of the cavity through the pressure line 56 while the pressure line 54 is connected to exhaust, the diaphragm 53 is moved to an inward position shown. Conversely, if the opposite air connections are provided, the diaphragm 53 moves to the outer position. A rod 57 is connected between the diaphragm 53 and the rack carrier 44 so that inward movement of the diaphragm to the position of FIGURE 1 moves the rack 39 into engagement with the pinion 14 and the outward movement of the diaphragm 53 causes disengagement of the rack 39 and the pinion 14.

A lock tooth 58 is bolted to the rack carrier 44 and is adapted to fit into any of the sockets 19 on the index ring 18 whenever the rack 39 is disengaged from the pinion 14. The lock tooth 58 is sized to clear the ring 18 whenever the rack 39 is fully meshed with the pinion 14 but is proportioned so that it remains in partial engagement with the ring until the rack teeth 41 establish partial meshing with the pinion 14 so that the table 13 is always controlled.

In order to adjust the stroke of the rack 39 and in turn the amount of indexing, an adjustment (FIGURES 1 to 3) is provided. Mounted on the bottom of the base 10 is a bracket 59 formed with a bearing 59' in which one end of a rod 61 is journalled. The other end of the rod 61 extends through a bore 62 formed in the base extension 10'. Thus, the rod 61 is supported on both ends for rotation about its axis. A shoulder 63 on the rod 61 co-operates with a crank 71 fixed on the rod 61 to engage opposite side walls of the extension 10' and prevents axial movement of the rod. A cylindrical member 66 is mounted on the rod 61 and is rotationally locked thereon by a pin 67 carried by the rod and extending through a slot 68 formed in the member 66. Axially, the slot is somewhat larger than the diameter of the pin, thereby permitting free but limited relative axial movement between the member 66 and rod 61. A spring 69 extends between the bearing 59' and the end of the cylindrical member 66 and urges it to the left extreme of its travel relative to the rod 61.

Figures 1, 2, 3:
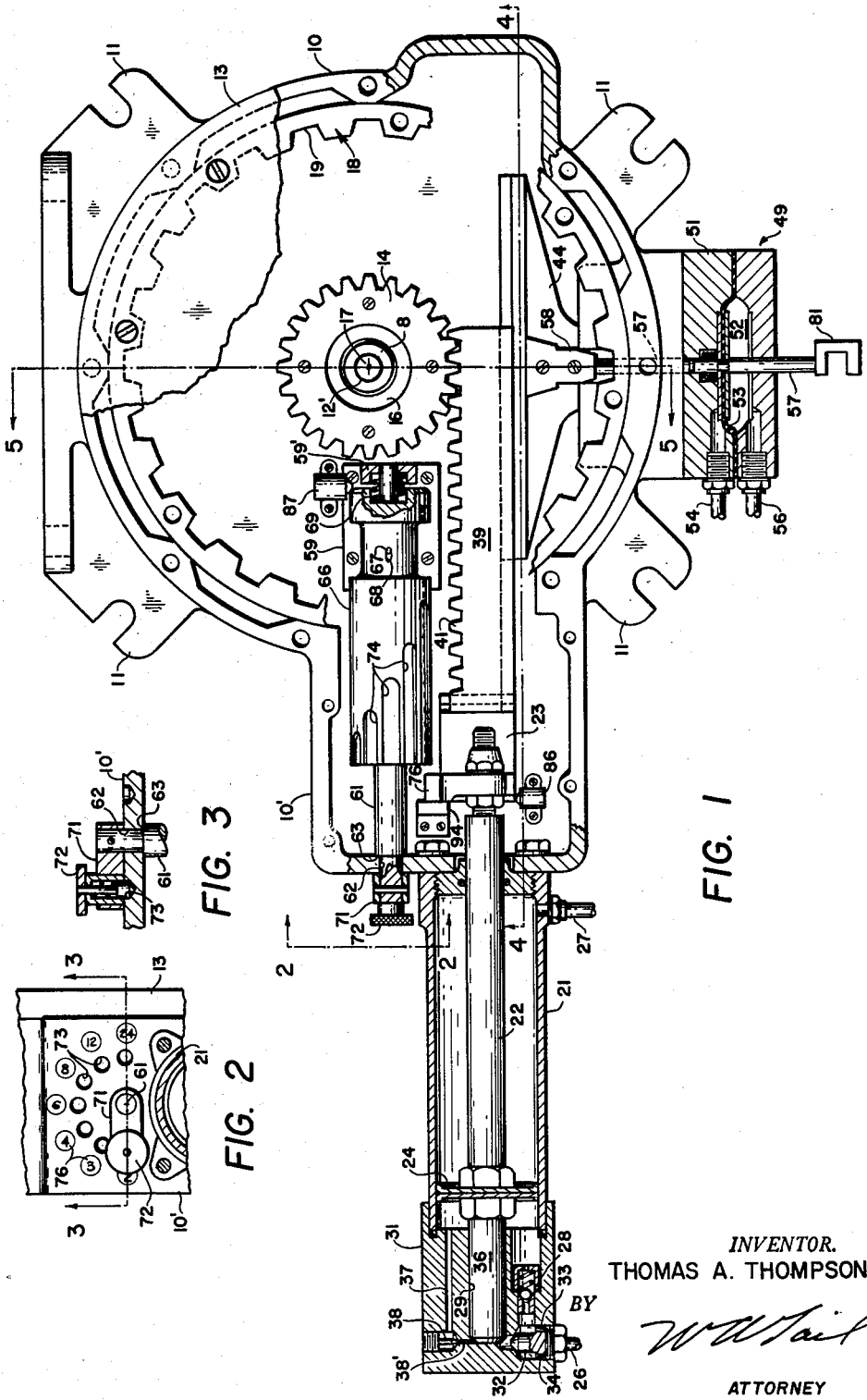
FIGURE 1 is a plan view partially in section showing the general structural arrangement of the indexing table.
FIGURE 2 is a fragmentary view taken along 2—2 of FIGURE 1 illustrating the indexing adjustment mechanism.
FIGURE 3 is a fragmentary section taken along 3—3 of FIGURE 2 showing the adjustment arm structure.

In order to selectively lock the rod 61 and in turn the cylindrical member 66 in one of a plurality of rotational positions, the crank 71 pinned to the outer end of the rod 61 on the outside of the base 10, carries a spring loaded plunger 72 (FIGURE 3) adapted to extend into any one of a plurality of sockets 73 formed in the base 10 around the axis of the pin 61 (FIGURE 2). In order to rotate the rod 61 from one position to another, it is merely necessary to pull the spring loaded plunger 72 out of its associated socket 73 and rotate the crank 71 until the plunger 72 is aligned with the desired socket 73 at which time it is released to extend into the desired socket.

The cylindrical member 66 is formed with a plurality of axially extending grooves 74 which are selectively rotatable into alignment with a projection 76 on the cross head 23 by the movement of the crank 71. As either of the sockets 73 is engaged by the spring loaded plunger 72, it automatically brings one or the other grooves 74 into alignment with the projection 76 which is proportioned to move along the aligned groove. The length of the groove 74 which is aligned with the projection 76 together with the slight movement of the cylindrical member 66 to the right determines the stroke of the rack 39 since the projection 76 bottoms when it reaches the end of the aligned groove 74. As the projection reaches the end of the aligned groove 74, it moves the cylindrical member 66 slightly to the right against the spring 69 until it engages the bearing 59', and performs the functions hereinafter described. The proper selection of the rotational position of the cylindrical member 66 determines the length of the stroke of the rack 39 and in turn the amount of rotary movement of the table 13 during one cycle of indexing. The length of the grooves 74 should be arranged so that they provide an indexing movement which is an even division of a full rotation of the indexing table. Thus, if there are twenty-four sockets 19 in the indexing ring 18, the various grooves can be arranged so that the smallest amount of indexing movement will move the table 13 through one twenty-fourth of a full revolution. Other grooves may be arranged to provide twelve, eight, six, four, three, and two equal indexing movements per revolution. Indicia 76 may be printed on the base 10 adjacent to the sockets 73 to assist the operator in determining the proper adjustment of the device.

Figure 10:
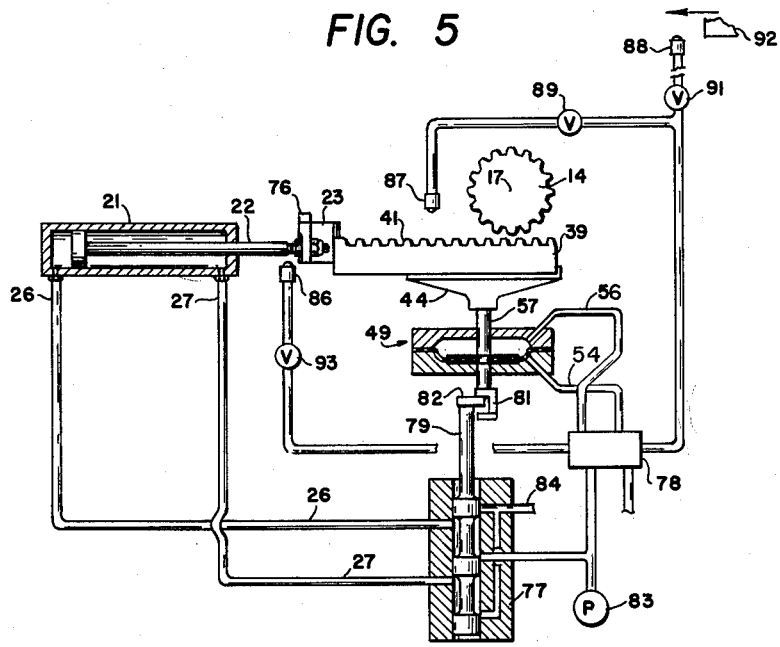
FIGURE 10 is a schematic illustration of the pneumatic control circuit utilized to control and operate the indexing table.

Referring to FIGURE 10 which represents a schematic view of the pneumatic control for the indexing table, a four-way valve 77 is connected to the pressure lines 26 and 27 so that it operates to control the axial movement of the rack 39. A second four-way valve 78 is connected to the pressure lines 54 and 56 and operates to control the movement of the diaphargm 53 and in turn the rack carrier 44. The valve 77 is provided with the usual spool 79 which is connected to be shifted by a lost motion connection operated by the movement of the diaphragm 53. The rod 57 is connected at its outer end to a U-shaped drive member 81 which extends on either side of a lateral projection 82 formed on the spool 79. The various proportions are arranged so that when the diaphragm 53 moves to its outer, or lower, position, at which time the rack 39 disengages the pinion 14, the spool 79 is shifted to connect the pressure line 26 to a pump 83 and the pressure line 27 to the exhaust 84. This produces movement of the piston head 24 and of the rack 39 toward the right until it reaches the end of its stroke. When the valve 78 is then operated to move the diaphragm 53 inward into its upper position to intermesh the rack 39 with the pinion 14, the spool 79 reverses the connections and the pressure line 27 is pressurized while the pressure line 26 is connected to exhaust. When this takes place, the rack 39 is moved to the left while it meshes the pinion 14 and rotates the table 13 in a clockwise direction.

Figure 11:
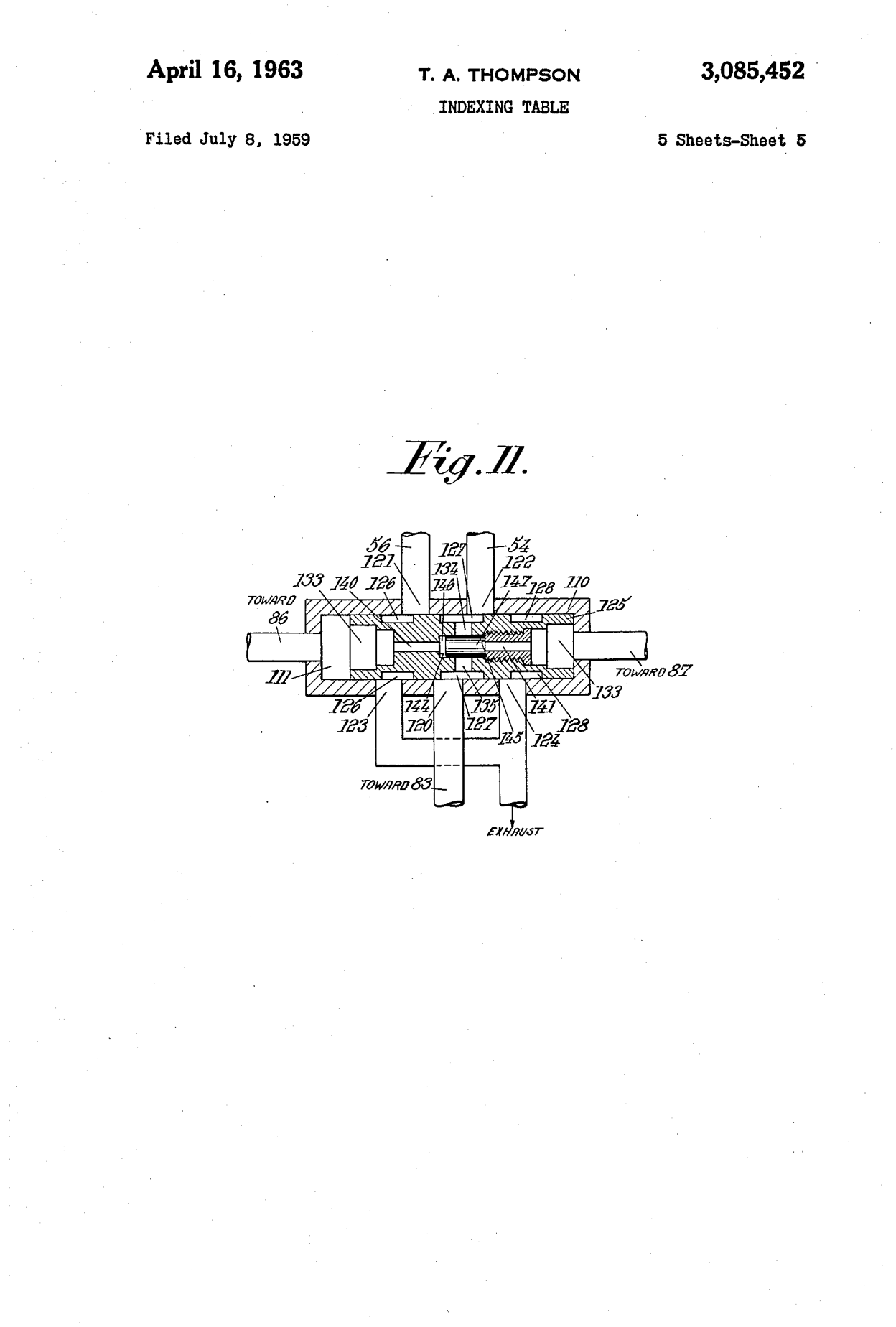

The valve 78 is the type disclosed in the patent to Raymond G. Olson, No. 2,729,242, which can be operated by remote bleeders 86, 87, or 88. This valve 78, as shown by the detail view of FIG. 11, comprises a housing or body 110 provided with a longitudinal cylindrical bore 111, in which is slidably fitted a cylindrical spool 125; this spool is provided with longitudinally spaced apart annular grooves 126, 127 and 128. The spool is further provided with a longitudinal passage 133 extending centrally thereof.

Radial passages 134 and 135 in the valve body 125 join the centrally disposed annular groove 127 with the longitudinal passage 133 within the valve.

The longitudinal passage 133 comprises a central chamber 146 and, on either side thereof, a passage 140, 141, respectively, of smaller diameter, so as to form two valve seats 144 and 145 at the inner ends of said passages 140 and 141.

A small center valve member 147 is slidably mounted in the chamber 146 and is adapted to engage either of the valve seats 144 and 145 to thus substantially cut off the passage of fluid to either end of the spool 125.

The bore 111 of the valve body 110 includes spaced apart passages 121 and 122, connected with lines 56 and 54 respectively, an inlet passage 120 connected with pump 83 and two exhaust passages 123 and 124.

When the spool 125 is in centered position within the line 111, the pump 83 continually delivers fluid under pressure through the inlet passage 120, and this fluid passes through the annular groove 127 and thence outwardly through restricted passages to the outlet passages 121 and 122 inasmuch as both of these passages are slightly "cracked" to the groove 27 in this position. Springs (not shown) disposed on opposite sides of the spool 125 and the balanced fluid pressure in the bore 110 on opposite sides of the spool 125 ensure this static central position of the valve.

When the bleeder 87 is opened, the fluid in the right-hand end of the bore 111 escapes and the central valve 147 is drawn or "sucked" into engagement with the valve seat 145. This causes a differential in the size of the central passage 140—141 whereupon the spool 125 moves quickly toward the right. This directs full delivery of fluid under pressure from the passage 120 through the annular groove 127 to the passage 122 and the line 54, thus causing the diaphragm 53 to come into its upper position. At the same time, the annular groove 127 ceases to communicate with the passage 121 leading to the line 56. But this passage 121 is then in communication with the annular groove 126, so that the fluid under the diaphragm 53 escapes to exhaust through the line 56, the groove 127 and the passage 123.

Of course, when the fluid in the left-hand end of the bore 111 is allowed to escape, by the opening of the bleeder 86, the spool 125 is moved toward the left, the line 56 is fed with the whole delivery of the pump 83, through the passage 120, the annular groove 127 and the passage 121, while the line 54 is connected to exhaust through the passage 121, the annular groove 128 and the port 124. The line 56 opening into the space above the diaphragm 53, this diaphragm is pushed into its lower position. One of the remote bleeders 86 is adapted to be engaged by the cross head 23 when the rack reaches the end of its leftward stroke and this bleeder 86 then operates to shift the diaphragm 53 to its outward, or lower, position as shown in FIGURE 10. This, in turn, through the connection between the diaphragm 53 and spool 79, operates to cause the rack 39 to move downward. If the indexing table is to be automatically cycled, the bleeder 87 is connected to the valve 78 by opening a shut off valve 89. Therefore, when the rack 39 reaches the right-hand end of its stroke, the bleeder 87 is engaged to shift the valve 78. This in turn returns the diaphragm 53 to its inward, or upper, position and meshes the rack 39 and the pinion 14 while simultaneously reversing the spool 79 and initiating leftward movement of the rack 39. The two bleeders 87 and 88 are not used simultaneously so if the initiation of the indexing table cycle is to be controlled by the bleeder 88, the shut off valve 89 is closed and the shut off valve 91 is open. Normally, the bleeder 88 is located for engagement by a portion 92 of the machine which is performing the operations on the work pieces carried by the indexing table. This portion should be arranged to engage the bleeder 88 only when the machining operation is completed. If this type of automatic operation is not desired, the bleeder 88 may be manually operated.

When it is desired to stop the rack 39 at the outer end of its stroke, a shut off valve 93 is closed to isolate the bleeder 86 from the valve 78. Since the projection 76 is only clear of the grooves 74 when the rack 39 is in its outer or left-hand end of the stroke (as shown in FIGURE 1), it is necessary to close the bleeder 86 so that the rack 39 will stop at the outer end of its stroke when it is desired to rotate the cylindrical member 66 and change the indexing adjustment of the device. The bleeder 86 is mounted on a bracket on the base 10 so that it is engaged by the cross head 23 just before the cross head 23 engages a fixed stop 94. The bleeder 87 is mounted so that it is engaged by the end of the cylindrical member 66 when the spring 69 is compressed by movement of the rack 39 to its inward end of its stroke. Because the cylindrical member 66 is bottomed against the bracket 59, regardless of the stroke provided by the adjusting mechanism, the bleeder 87 properly functions for all positions of adjustment. For purposes of simplicity, however, the schematic illustration of FIGURE 10 shows the bleeder 87 as engageable by the rack 39 rather than the cylindrical member 66.

Figure 6:
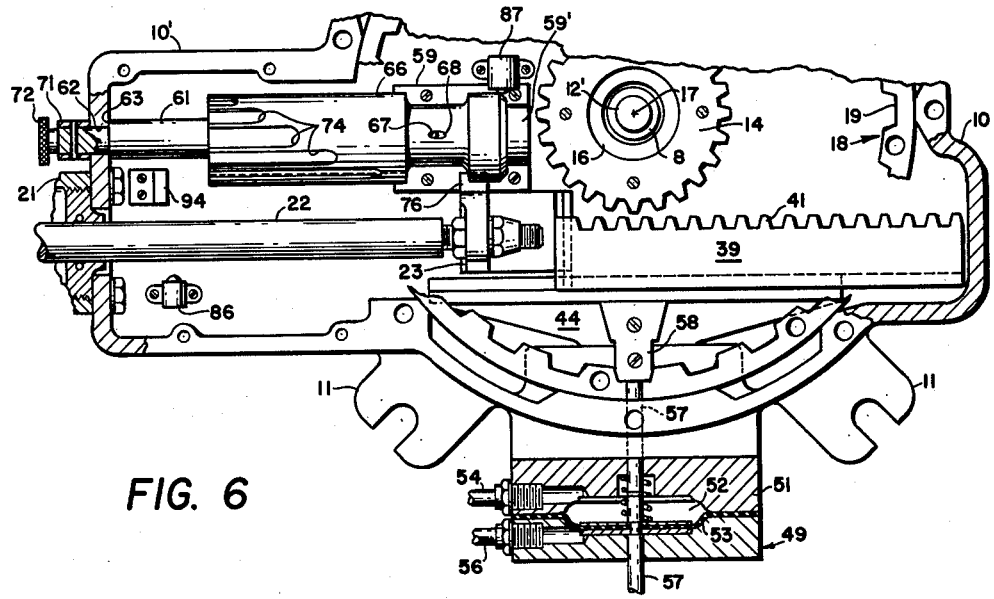
FIGURE 6 is a fragmentary plan view showing the position the elements assume before the table starts a cycle of indexing operation.
Figure 7:
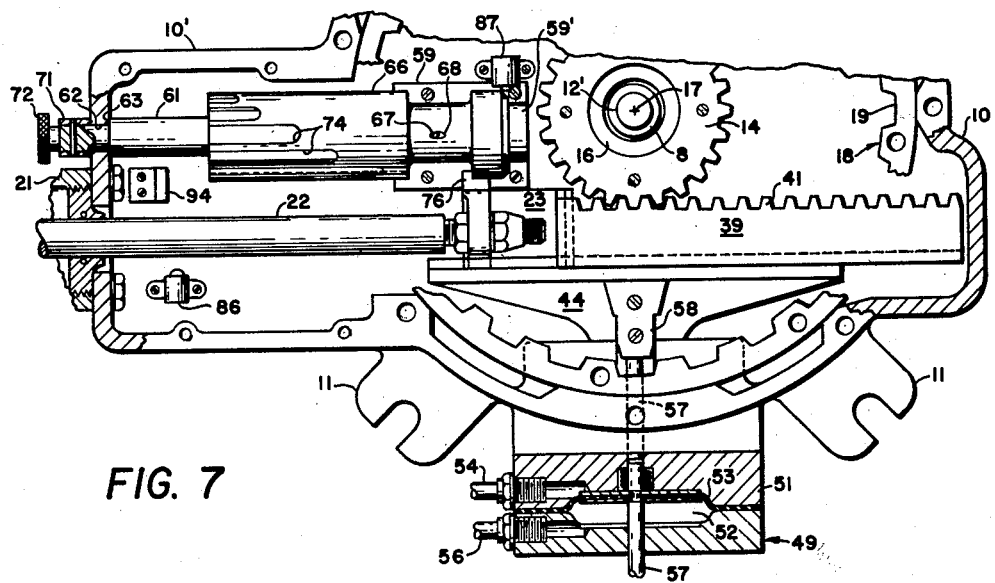
FIGURE 7 is a view showing the position the elements assume when the rack is moved inward during the first phase of the indexing operation.

Referring now to FIGURES 6 through 9, at the beginning of a cycle of indexing operation, the rack 39 is disengaged from the pinion 14 and at the inward end of its movement as shown in FIGURE 6. At this time, the lock tooth 58 engages the index ring 18 and accurately locates and locks the table 13. At the beginning of the cycle, one of the bleeders 87 or 88 is operated and the diaphragm 53 moves the rack carrier 44 inward causing the rack 39 to engage the pinion 14 and at the same time, disengaging the lock tooth 58 from the index ring 18 as shown in FIGURE 7. This movement shifts the valve 77 and causes the rack 39 to move to the left to impart rotation to the table in a clockwise direction until the bleeder 86 is operated and the rack 39 is stopped by the fixed stop 94, as shown in FIGURE 8. Operation of the bleeder 86 shifts the valve 78 which causes the diaphragm 53 to move outward and disengage the rack 39 from the pinion 14 and re-engage the lock tooth 58 with the index ring 18. This movement of the diaphragm 53 shifts the valve 77 and causes the rack 39 to return to the position of FIGURE 6. If the indexing table is to be operated automatically as a continuous cycling device, the bleeder 87 is used. However, if the table is to be started either by manual means or by the operation of the associated machinery, the bleeder 88 is used.

It should be noted that the rack 39 moves inward automatically and comes to rest in the position of FIGURE 6 when the table operation is initiated by external means. This decreases the time of the indexing operation by causing the rack 39 to move to its ready or cocked position while the machining operation is being formed on the work piece. Therefore, immediate indexing is provided when the machining operation is completed.

The use of the cushioning mechanism located in the cylinder head 31 insures that the table will not be abruptly brought to rest at the end of the rotational movement even though the table is adjusted to operate at a relatively high rate of speed. The inward movement of the rack 39 does not rotate the table 13 so cushioning is not needed on the inward end of the stroke.

Extremely accurate work piece positioning is provided because the lock tooth 58 is arranged to always engage both sides of the sockets 19 on the index ring 18 and, if any wear occurs in the stroking mechanism of the rack 39, it will not result in misalignment of the work pieces. Because of the adjusting feature, an indexing table according to this invention is substantially universal in its application and can be installed in a large variety of automation installations. Also, the simplicity of operation and the positive locking of the table insures accurate operation.

Although a preferred embodiment of this invention is illustrated, it will be realized that various modifications of the structural details may be made without departing from the mode of operation and the essence of the invention. Therefore, except insofar as they are claimed in the appended claims, structural details may be varied

I claim:

1. An indexing table comprising a base, a table journalled to said base for rotation relative thereto, a rotatable pinion gear connected to rotate said table, a rack movably mounted on said base, a first fluid actuator connected to axially reciprocate said rack relative to said pinion, a second fluid actuator connected to said rack operable to move it between a position meshed with said pinion to a disengage position spaced to said pinion, a first valve controlling the reciprocation of said first actuator, a mechanical drive connecting said second actuator and first valve operating said valve in response to movement of said second actuator, an air operated second valve controlling the operation of said second actuator, first pneumatic means controlling said second valve in response to movement of said first actuator to shift said second valve and move said second actuator to said disengaged position, second pneumatic means controlling said second valve to shift said second actuator to said meshed position, and adjustable stops controlling the strokes of said first actuator.

2. An indexing table comprising a base, a table journalled on said base for rotation about an axis, a pinion mounted on said table for rotation therewith about said axis, a first fluid motor on said base having an output element reciprocable in indexing and return strokes, an elongated rack connected for reciprocation by said output element of said first motor, a second fluid motor having an output element reciprocable laterally relative to said rack connected thereto to move said rack between meshed positions with said pinion and disengaged position spaced from said pinion, a first valve connected to produce reciprocation of said first motor, a lost motion drive operating said first valve in response to movement of said second motor, a second pneumatically operated valve connected to produce reciprocation of said second motor, first pneumatic operating means engageable by said output member of said first motor at the end of said indexing stroke operable to shift second valve and operate said second motor to move said rack to said disengaged position, movement of said rack to said disengaged position shifting said first valve to operate said first motor through a return stroke, second pneumatic control means connected to said second valve operable to shift said second valve and move said rack to said meshed position, and a lock operated by said second motor locking said table against rotation when said rack is in said disengaged position, said lock operating to prevent uncontrolled rotation of said table before complete disengagement of said rack from said pinion.

References Cited in the file of this patent

UNITED STATES PATENTS

| | | |
|---|---|---|
| 2,359,420 | Herzog | Oct. 3, 1948 |
| 2,672,773 | Schofield | Mar. 23, 1954 |
| 2,704,030 | Glennon et al. | Mar. 15, 1955 |
| 2,800,038 | Jonson | July 23, 1957 |
| 2,902,889 | Trechsel | Sept. 8, 1959 |